Sept. 29, 1959 J. S. WROBY 2,906,572
DRIVE SHAFT VIBRATION ISOLATION MOUNT
Filed July 17, 1957
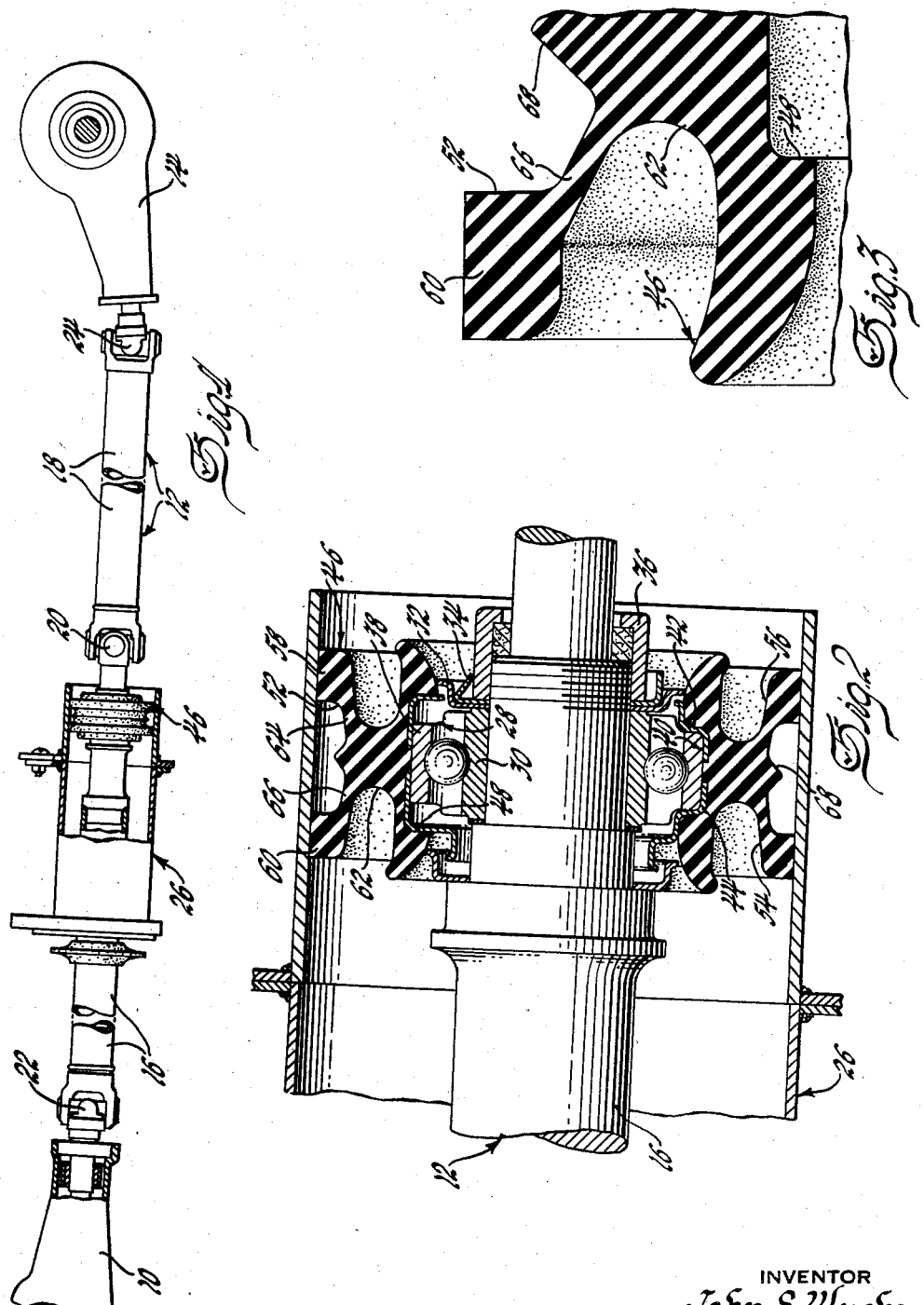
INVENTOR
John S. Wroby
BY
ATTORNEY

United States Patent Office 2,906,572
Patented Sept. 29, 1959

2,906,572
DRIVE SHAFT VIBRATION ISOLATION MOUNT

John S. Wroby, Birmingham, Mich., assignor to General Motors Corporation, Detroit, Mich., a corporation of Delaware Application July 17, 1957, Serial No. 672,456

9 Claims. (Cl. 308—184)

This invention relates to drive shaft bearing support means in general and more particularly to a vibration isolating mount for supporting a bearing member located near the center universal joint of a two-piece drive shaft on an automotive vehicle.

Due to the running loads in a vehicle drive shaft, dynamic forces act upon the shaft and upon a center bearing support member when used and tend to transmit vibration and noise through the bearing and its support and into the vehicle body. These vibrations and noises are best isolated by the use of a relatively radially soft mount for supporting the drive shaft center bearing to the vehicle frame or underbody.

It is here proposed to make use of a bearing mount which uses rubber-in-shear to provide a low load vs. deflection radial rate to obtain the radial softness required. The bearing mount includes an annular rubber body portion receiving the bearing member within its inner periphery and has spaced annular beads or leg portions connected to the body portion by generally conical webs which receive the shear loads and provide the radial softness mentioned. The leg portions also serve to provide a sliding snug fit between the bearing mount and a retainer tube within which the mount is preferably disposed and permit axial movement of the drive shaft and its center bearing mount as necessary to accommodate shaft and engine mislocation and fore and aft movement. A snubbing bead is provided about the body portion of the mounting member between the leg portions thereof to gradually limit excessive deflections of the bearing which occur under abnormal conditions, and the inner surface of the body portion of the mount includes means for locking the outer bearing race against movement relative to the mount.

The proposed vibration isolating mount, having the rubber-in-shear action for radial operating loads, does not subject local rubber areas of the mounting block to concentrations of high percentage elongations or stretch and therefore has excellent fatigue life. It is also apparent that by changing the thickness of the supporting webs of the proposed mount and/or by varying the rubber durometer that a broad range of radial rates is obtainable from the same general configuration of mount.

In the drawings:

Figure 1 shows a two-piece vehicle drive shaft having a vibration isolation mount of the type proposed for supporting the shaft near the center universal joint.

Figure 2 is an enlarged cross-sectioned view of the proposed vibration isolation mount.

Figure 3 is a fragmentary cross-sectional view on an enlarged scale of the vibration isolation mount shown in Figure 2.

In the drawings the output end 10 of an engine and transmission unit is shown having a two-piece vehicle drive shaft 12 connected thereto and to a rear axle differential drive unit 14.

The two-piece rotary drive shaft 12 includes a forward drive section 16 and an after drive section 18 connected together by a universal joint 20. The forward section of the drive shaft member is connected to the output end of the engine and transmission unit by a universal joint 22 and the after section of the drive shaft member is connected to the differential by a universal joint 24.

A cylindrical or tubular member 26 is supported by the vehicle underbody framework to receive the after end of the forward section 16 of drive shaft 12 therethrough just forwardly of the center universal joint 20.

A ball bearing member 28 is journaled on the end of the forward drive shaft section 16 and has the inner race 30 thereof and dirt shields 32 and 34 engaged against a shoulder on the shaft by lock nut means 36. The outer race 38 of the bearing member is disposed within a retainer cage 40 comprised of parts 42 and 44.

The drive shaft and its ball bearing member 28 are supported within the tubular member 26 by a mounting block 46 of resilient material; preferably rubber or like synthetic.

The mounting block 46 includes an inner peripheral groove 48 within which the ball bearing member 28 and its retainer cage 42 is received. The groove 48 is sized and formed such that there is a frictional lock imposed between the material of the mounting block and the retainer cage and the outer ball bearing race to prevent relative movement therebetween.

The mounting block also includes an outer peripheral groove 52 and annular grooves 54 and 56 formed within the side or end walls of the mounting block. The end wall grooves 54 and 56 in combination with the outer peripheral groove 52 cause the formation of flanges 58 and 60 which are spaced laterally and radially apart from the bearing receiving portion 62 of the mounting block and are connected thereto by webs 64 and 66.

Figure 3 shows the proposed mounting block in enlarged detail and prior to installation within the tubular member 26. The web portions 64 and 66 are generally conical in their free position and thereby provide a longer web with more material for a greater dissipation of vibration initiating forces than if they were axially disposed. There is also some limited degree of axial stress loading in having the webs conical since they are inclined as regards both axial and radial forces received from the supported shaft.

The flanges 58 and 60 are snuggly fit within the tubular member 26 but are slidable on installation for alignment purposes and are subjected to some creep in operation of the drive shaft to accommodate any excessive axial movement thereof.

A snubbing bead or ring 68 is formed from the bearing receiving portion 62 of the mounting block peripherally therearound between the flanges 58 and 60 and within the grooves 52.

In the course of operating the drive shaft, the dynamic forces due to running loads in the drive shaft and which tend to transmit vibration and noise into the car body, are received within the mounting block 46. These forces are intercepted in shear within the webbed portions 64 and 66 of the mounting block. The use of rubber-in-shear at the webs enables having a relatively radially soft mount since a low radial load vs. deflection rate can be provided for by having the webs of such thickness and the material thereof of such durometer that suitable isolation of the radial operating loads is insured.

The rubber-in-shear action, for the radial operating loads, does not subject local areas to concentrations of high percentage elongations or stretch and thus excellent fatigue life for the mount is assured.

The snubbing bead or ring 68 is provided to gradually limit excessive deflections of the drive shaft which may occur under abnormal conditions. At such times, the ring is engaged to the tubular member and receives the abnormal deflection load in compression.

What is claimed is:

1. A vibration isolating rotary shaft support comprising a resilient mounting block peripherally received by support means and adapted to receive a rotatable shaft therethrough, annular flanges formed from said mounting block and spaced radially and laterally apart therefrom, and generally conical webs connecting said flanges to said block for receiving vibration initiating forces from said rotary shaft in shear.

2. A vibration isolating rotary shaft support comprising a tubular support member having an annular and resilient mounting block received therein and adapted to receive said rotary shaft therethrough, said mounting block including annular flanges spaced radially and laterally apart from said block and having generally conical webs formed integrally therewith and connecting said flanges thereto, said flanges engaging said tubular member and spacing said mounting block otherwise apart therefrom, and said webs being disposed to receive in shear vibration initiating forces from said rotary shaft in operation.

3. A vibration isolating rotary shaft support comprising a resilient and annular mounting block for receiving said shaft therethrough and having flanges formed therefrom and spaced laterally and radially apart therefrom for engaging supporting means circumferentially thereof and spacing the shaft receiving portion of said block apart therefrom, said block including generally conical webs spaced apart from said support means and said shaft and engaging said flanges to said block for receiving in shear dynamic drive forces initiated by said rotary shaft and received by said mounting block.

4. A vibration isolating rotary shaft support comprising a resilient mounting block for receiving a rotatable shaft therethrough and including annular grooves formed in both side faces and peripheral walls thereof, the inner peripheral groove thereof being adapted to receive the outer race of bearing means journaled upon said shaft, and the outer peripheral groove in combination with the side face grooves forming web portions for intercepting in shear dynamic drive forces initiated by said shaft and normally passed through said mounting block to the outer peripheral limits thereof.

5. A vehicle drive shaft center bearing support comprising a tubular member adapted to be secured to the underbody framework of a vehicle and to have a drive shaft extended therethrough, a resilient member disposed within said tubular member for spacing said shaft apart therefrom, said resilient member having only the ends thereof engaging said tubular member and only the center portion thereof disposed to receive said shaft, and generally conical webs connecting said ends and center portion of said mounting member to provide a shear barrier against vibration initiating forces emanating from said drive shaft in operation.

6. A vehicle drive shaft center bearing support and vibration isolating means comprising a cylindrical member adapted to be secured to the underbody framework of a vehicle and to receive a vehicle drive shaft therethrough, a resilient mounting block slidably disposed within said cylindrical member and adapted to receive said drive shaft therethrough and to space said shaft apart from said cylindrical member, said mounting block including an inner peripheral annular groove formed therein for receiving the outer race of a center bearing member journaled upon said shaft and being undersized in comparison thereto to provide a friction lock against relative movement of said outer race therein, an outer peripheral groove formed in said mounting block and providing spaced annular flanges at each end of said block for engaging said cylindrical member, and annular grooves formed within the end faces of said block and providing, in combination with said outer peripheral groove, generally conical web portions connecting said flanges to said bearing receiving portion of said mounting block and spaced apart from said cylindrical member and said shaft to receive in shear vibration initiating forces emanating from said rotary shaft.

7. A vibration isolating rotary shaft support comprising a tubular support member having an annular and resilient mounting block received therein and adapted to receive said rotary shaft therethrough, said mounting block including annular flanges spaced radially and laterally apart from said block and having generally conical webs formed integrally therewith and connecting said flanges thereto, said flanges engaging said tubular member and spacing said mounting block otherwise apart therefrom, said webs being disposed to receive in shear vibration initiating forces from said rotary shaft in operation, and said mounting block slidably disposed within said tubular support member and including a snubbing ring formed about said mounting block and between said flanges for limiting excessive deflection of said shaft by prior engagement of said ring with said tubular member.

8. A vibration isolating rotary shaft support comprising a resilient and annular mounting block for receiving said shaft therethrough and having flanges formed therefrom and spaced laterally and radially apart therefrom for engaging supporting means circumferentially thereof and spacing the shaft receiving portion of said block apart therefrom, said block including generally conical webs spaced apart from said support means and said shaft and engaging said flanges to said block for receiving in shear dynamic drive forces initiated by said rotary shaft and received by said mounting block, and an annular snubbing ring formed integrally with and about said shaft receiving portion of said mounting block and between said flanges for limiting excessive radial deflection of said shaft by engagement with said supporting means.

9. A vehicle drive shaft center bearing support comprising a tubular member adapted to be secured to the underbody framework of a vehicle and to have a drive shaft extended therethrough, a resilient member disposed within said tubular member for spacing said shaft apart therefrom, said resilient member having only the ends thereof engaging said tubular member and only the center portion thereof disposed to receive said shaft, generally conical webs connecting said ends and center portion of said mounting member to provide a shear barrier against vibration initiating forces emanating from said drive shaft in operation, and an annular snubbing ring formed peripherally about said center portion of said mounting block for limiting in compression excessive deflection of said shaft by engagement thereof with said tubular member.

References Cited in the file of this patent

UNITED STATES PATENTS 274,187     Goubert _____ Mar. 20, 1883

FOREIGN PATENTS 764,124     Great Britain _____ Sept. 19, 1956